United States Patent [19]
Wolcott

[11] B 3,984,854
[45] Oct. 5, 1976

[54] ONE-PIECE LIGHT CONE BAFFLE

[75] Inventor: Dana Whitney Wolcott, Hilton, N.Y.

[73] Assignee: Eastman Kodak Company, Rochester, N.Y.

[22] Filed: Mar. 17, 1975

[21] Appl. No.: 559,111

[44] Published under the second Trial Voluntary Protest Program on February 24, 1976 as document No. B 559,111.

[52] U.S. Cl. .............................. 354/288; 354/354
[51] Int. Cl.² ...................................... G03B 17/02
[58] Field of Search ........... 354/288, 202, 219, 187, 354/354

[56] References Cited
UNITED STATES PATENTS

| | | | |
|---|---|---|---|
| 259,064 | 6/1882 | Walker | 354/174 |
| 993,047 | 5/1911 | Folmer | 354/288 X |
| 1,291,405 | 1/1919 | Champeau | 354/188 |
| 1,479,112 | 1/1924 | Sparks | 354/202 |
| 2,557,297 | 6/1951 | Lea | 354/219 X |
| 2,665,618 | 1/1954 | Heidecke | 354/288 |
| 3,344,725 | 10/1967 | Finelli | 354/288 |

FOREIGN PATENTS OR APPLICATIONS 838,063    6/1960    United Kingdom

Primary Examiner—R.L. Moses
Attorney, Agent, or Firm—Armin B. Pagel

[57] ABSTRACT

A one-piece light cone baffle for use in a camera comprising a frame and four walls integrally connected to the frame. The frame has centrally located therein a light-transmitting window. Each of the walls is connected to the frame by a hinge and is movable between a relaxed position extending outwardly from the frame and an operative position in which the walls cooperate to form a light tight seal. Means are also provided for reflecting non-image-forming light passing through the window away from a light-sensitive material and for securing the baffle in place in the baffle recess of the camera.

7 Claims, 5 Drawing Figures

ONE-PIECE LIGHT CONE BAFFLE

BACKGROUND OF THE INVENTION

1. Field of the Invention

The present invention relates in general to photographic apparatus, and more particularly, to a one-piece light cone baffle for use in such apparatus.

2. Description of the Prior Art

Some of the light entering a camera body through the taking lens enters at such an angle with respect to the optical axis that it does not initially fall upon the image area of the film. This light is not only useless in taking a picture, but the general illumination it causes in the camera body may fog the film (reducing the clairty and sharpness of the film image). Therefore, it has become customary to make the interior of the camera body flat black, as described in U.S. Pat. No. 1,479,112, so as to absorb as much of the stray light as possible during exposure.

In addition, various structural means have been devised for use as light-absorbers or baffles in a camera. In U.S. Pat. Nos. 259,064 and 993,047, cameras are disclosed having grooves or serrations running transverse to the optical axis that reflect unwanted light away from the light sensitive plate in the camera. U.S. Pat. No. 1,291,405 describes a camera with a folding bellows, each fold of the bellows having baffle plates that project at different angles in order to prevent non-image-forming light from reaching the photosensitive material. Other light-absorbing or scattering means are described in U.K. Pat. No. 838,063 and German Pat. No. 856,547.

In U.S. Pat. No. 2,665,618, a multi-piece light baffle structure is described which is inserted into a box type camera. Manufacturing and assembling of the individual pieces of this structure requires considerable expense and time.

Light baffle structures are also incorporated into small pocket cameras, adapted to receive size 110 film cartridges, that have recently been introduced to the photographic market. Such baffles generally comprise several plastic pieces having light-deflecting ridges to reflect unwanted light away from the film in the cameras. In a typical pocket camera, each piece of the baffle is fabricated to fit a particular side of a baffle recess behind the camera taking lens and is fastened within the baffle recess by conventional fasteners.

SUMMARY OF THE INVENTION

The present invention provides an improved light cone baffle that reduces fogging of film by reflecting unwanted light away from the image area of the film and that provides a light cone baffle inexpensively made from one piece of a flexible material such as plastic. The baffle includes a frame defining a light transmitting window and four walls integrally connected to the frame by bridging means, preferably relatively small pieces of flexible plastic. The walls may be moved to an operative position, forming a light tight seal, during insertion of the baffle into a baffle recess in the camera. The baffle is retained within the camera by the engagement of a protrusion on the side of one wall of the baffle with a notch in the wall of the camera's baffle recess and by the resilient biasing of the bridging means when the walls are in their operative position.

BRIEF DESCRIPTION OF THE DRAWINGS

In the detailed description of the preferred embodiment of the present invention outlined below, reference is made to the accompanying drawings in which.

DESCRIPTION OF THE PREFERRED EMBODIMENT

Because photographic apparatus is well known, the present description will be directed in particular to the elements forming part of the present invention and its use in such photographic apparatus. It will be understood that camera elements not specifically shown or described may take various forms well known to those having ordinary skill in the art.

Figure 1:
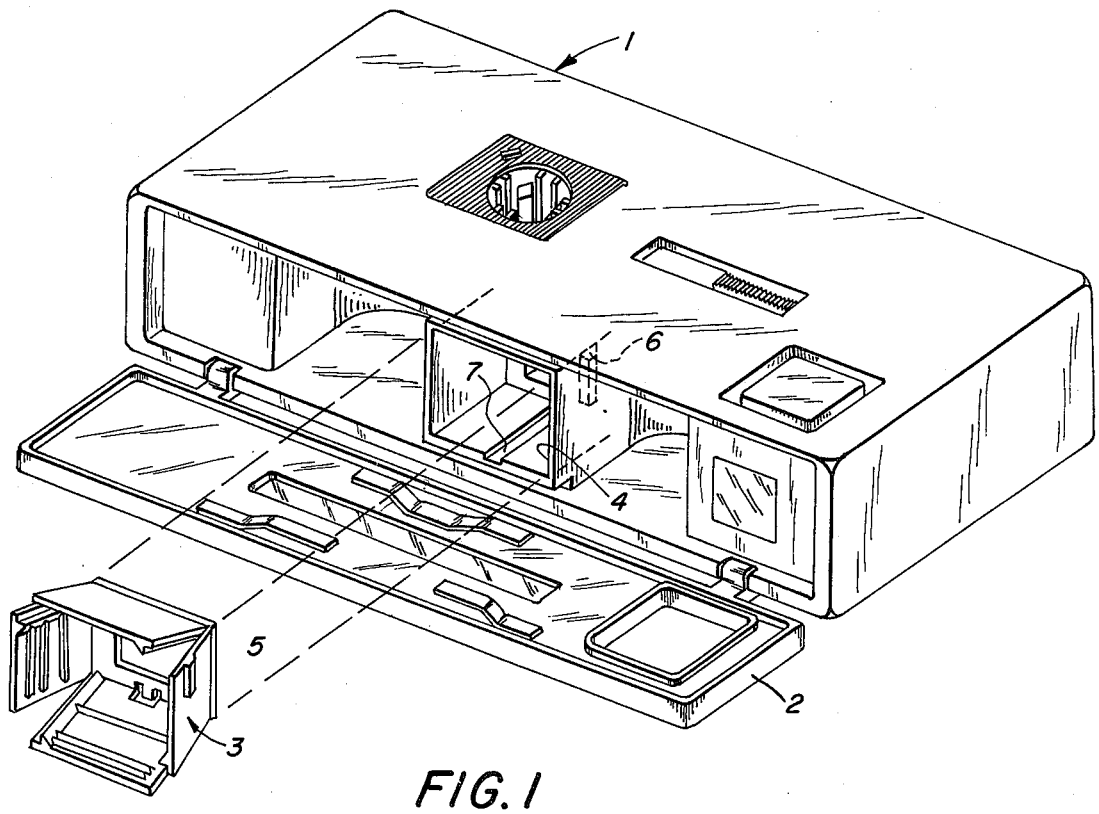
FIG. 1 is an exploded perspective view of a camera showing a baffle recess thereof and a baffle adapted to fit into the baffle recess in accordance with the present invention.
Figure 2:
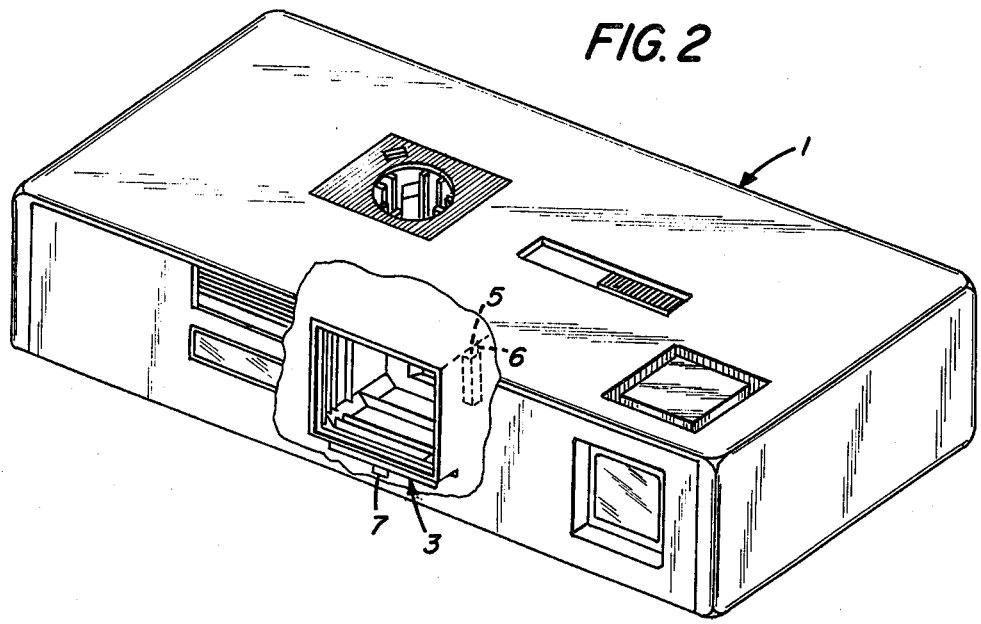
FIG. 2 is a perspective view of a camera, partially cut-away to show the baffle in place therein.

FIG. 1 shows a camera 1 with its film door 2 open. A baffle 3 is shown prior to insertion into a baffle recess 4 located between a taking lens and a film image area of camera 1. The taking lens and film image area are described later in connection with the description of FIG. 5. Camera 1 includes a notch 6 on one side wall of baffle recess 4. On an adjacent side wall, there is a groove 7 extending inwardly into baffle recess 4. Baffle 3 is inserted into baffle recess 4 with its walls folded into an operative state, and it is held in baffle recess 4 by a means for securing it in place. The securing means preferably comprises a protrusion 5 located on a surface of one wall of baffle 3 so that protrusion 5 is engageable with notch 6 within baffle recess 4 (see FIG. 5) when baffle 3 is properly inserted into baffle recess 4. FIG. 2 illustrates camera 1 with baffle 3 located and secured in position within baffle recess 4.

Figure 3:
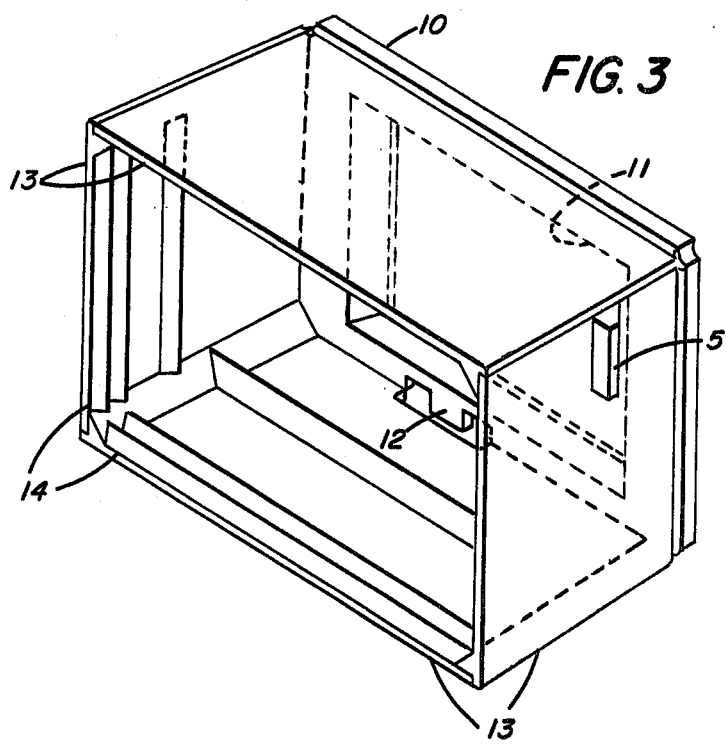
FIG. 3 is an enlarged perspective view of a baffle with each wall folded inward and engaging adjacent walls in an operative position, as when the baffle is installed in a camera.
Figure 4:
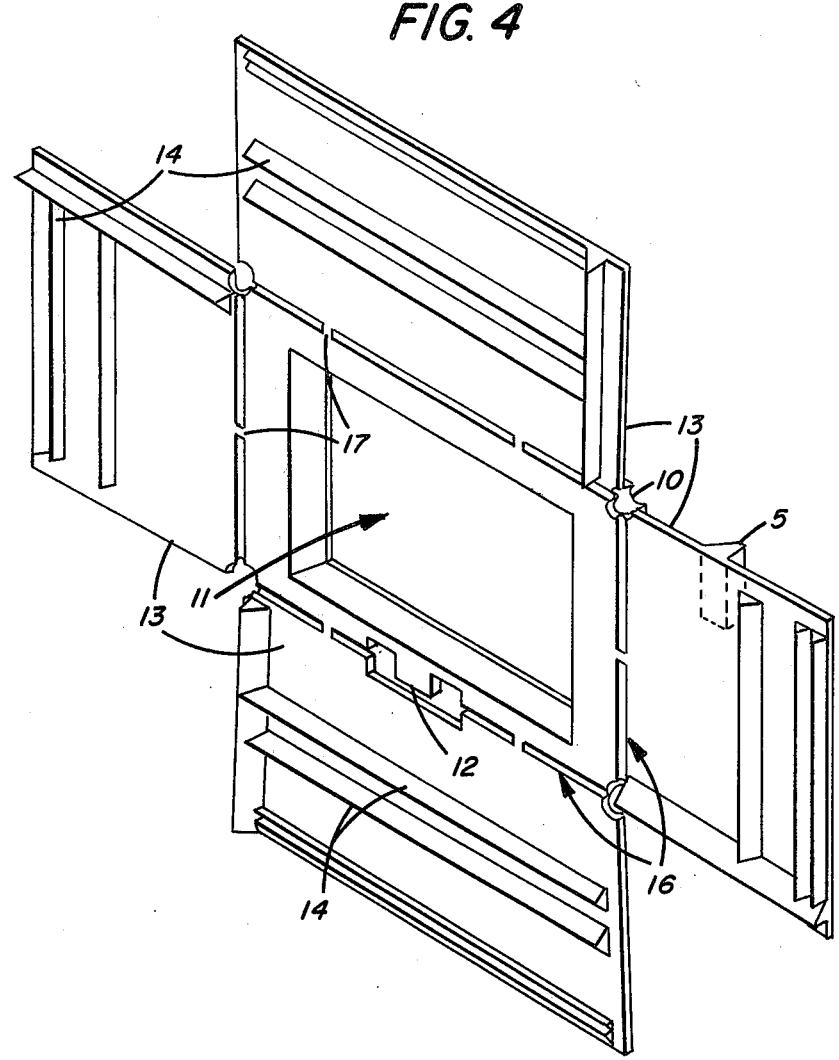
FIG. 4 is a perspective view similar to FIG. 3 but with all the walls in a relaxed position.

Referring now to FIGS. 3 and 4, a baffle 3 comprises a frame 10 and four walls 13 integrally connected to frame 10. Frame 10 defines a window 11, which is generally rectangular, is light-transmitting and is approximately centrally located within frame 10. Frame 10 further defines a protrusion 12 which extends outwardly from frame 10, as may be best seen in FIG. 4.

Figure 5:
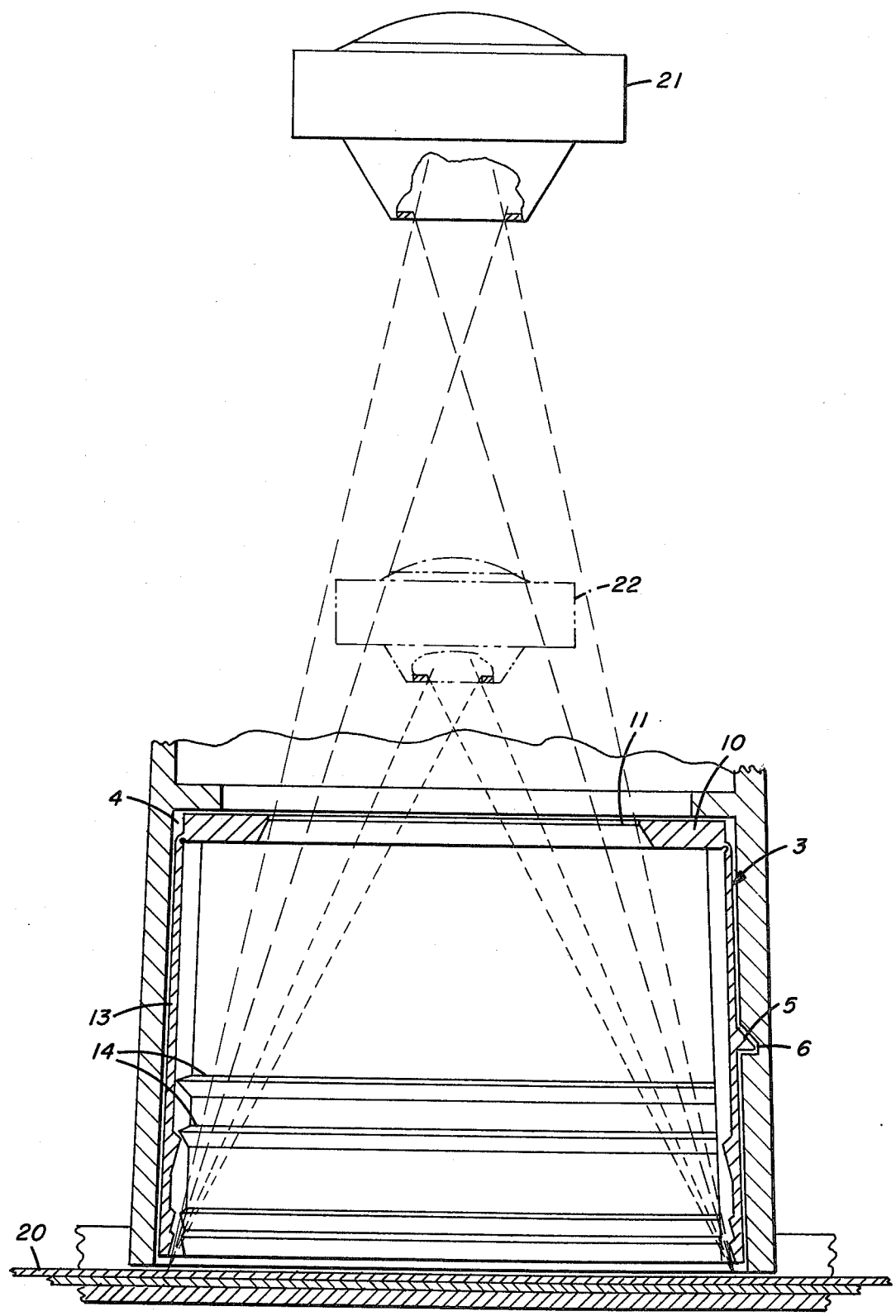
FIG. 5 is a partial sectional view through a camera, such as that shown in FIGS. 1 and 2, showing a baffle in relation to the taking lens and the film image area of the camera.

Means are formed on the inner sides of walls 13, i.e., the sides facing each other in the operative position, for reflecting non-image forming light passing through window 11 away from a light-sensitive film 20 located at the opposite end of baffle 3 from frame 10 (see FIG. 5). Preferably such means comprises ridges 14 integrally formed on the interior surfaces of walls 13. Also, the interior surfaces of walls 13 may be a dull black color. Walls 13 are generally trapezoidal in shape and are integrally connected to frame 10 via bridging means 16 comprising at least one hinge 17 for each wall 13. Each hinge 17 is of the type generally known as a "living hinge," is integrally connected to frame 10 and a wall 13, is about 0.010 to 0.020 inches in width (i.e., in the direction parallel to the edge of frame 10), preferably 0.015 inches, and is flexible, thereby having a resilient, spring-like property that biases its respective wall 13 outward to a relaxed position (FIG. 4). Walls 13 may be moved from their relaxed position to an operative position against the bias of hinges 17 during assembly. In the relaxed position, walls 13 and frame 10 are substantially in a common plane. In the operative position, each wall 13 is engaged with the two adjacent walls 13 to form an open-ended box having light-tight corners, as may best be seen in FIG. 3. Baffle 3 may be inserted within baffle recess 4 of camera 1 with protrusion 12 being inserted in groove 7 to properly align baffle 3 within baffle recess 4. When baffle 3 is fully inserted into baffle recess 4, protrusion 5 engages notch 6 in baffle recess 4, thereby securing baffle 3 in its mounted position in baffle recess 4.

Referring now to FIG. 5, a camera with which baffle 3 may be used may be of the type known as a dual lens camera, in which either of two lens systems 21 and 22 may be positioned in the optical axis of the camera. As may be seen, baffle 3 must be designed so that substantially all of the light within the effective cone from either lens system 21 or 22 may pass through window 11 to the image area of film 20. The shape and positions of ridge 14 reflect substantially all of the unwanted light that enters through window 11 away from film 20.

The construction of the light cone baffle of the present invention permits its being manufactured of relatively inexpensive materials. For instance, it may be formed of a single piece of molded plastic, thereby reducing manufacturing costs. Because only one piece is inserted into the baffle recess of the camera, instead of several separate pieces, and because no separate fasteners are needed, assembly is considerably easier and less expensive than with methods and apparatus presently known in the art.

The invention has been described in detail with particular reference to a preferred embodiment thereof, but it will be understood that variations and modifications can be effected within the spirit and scope of the invention.

I claim:

1. A light cone baffle for use in photographic apparatus containing a light-sensitive material, said baffle comprising:
    a member defining a light-transmitting window;
    a plurality of walls;
    means for integrally connecting said member with each of said walls so that said walls are movable between a relaxed position and an operative position;
    means positioned on said walls when in said operative position for reflecting non-image forming light passing through said window away from the light-sensitive material; and
    means for securing said baffle in place in the photographic apparatus with said walls in said operative position.

2. The light cone baffle of claim 1 wherein said integral connecting means comprises a plurality of hinges integrally connected to said member and said walls, each of said walls being integrally connected to said member by at least one of said hinges and each of said hinges resiliently biasing its respective wall toward said relaxed position.

3. The light cone baffle of claim 1 wherein each of said walls is shaped to engage each of the adjacent walls to form a substantially light tight seal when said walls are in said operative position.

4. The light cone baffle of claim 1 wherein said reflecting means includes ridges integrally formed on said walls.

5. The light cone baffle of claim 1 wherein said securing means includes a protrusion on one of said walls, said protrusion being adapted to engage a notch in the camera.

6. The light cone baffle of claim 1 wherein said member further comprises a protrusion adapted to engage a groove in the camera to properly locate said baffle within the camera.

7. A light cone baffle for use in a camera containing a film, said baffle comprising:
    a frame defining a light-transmitting window;
    a plurality of walls;
    means for integrally connecting said walls to said frame for movement between a relaxed and an operative position, said means comprising a plurality of hinges integrally connected to said frame and said walls, each of said walls being integrally connected to said frame by at least one of said hinges and each of said hinges resiliently biasing its respective wall toward its relaxed position;
    ridges integrally formed on said walls and positioned, when said walls are in said operative position, to reflect non-image forming light passing through said window away from the film;
    a protrusion on one of said walls adapted to engage a notch in the camera to retain said baffle with said walls in said operative position within the camera; and
    a protrusion on said frame adapted to engage a groove in the camera to align said baffle within the camera.

* * * * *